United States Patent [19]
Niimi

[11] Patent Number: 5,820,995
[45] Date of Patent: Oct. 13, 1998

[54] LAMINATED COMPOSITE CERAMICS AND ELEMENTS USING SAME

[75] Inventor: Hideaki Niimi, Shiga, Japan

[73] Assignee: Murata Manufacturing Co., Ltd., Kyoto, Japan

[21] Appl. No.: 736,810

[22] Filed: Oct. 25, 1996

[30] Foreign Application Priority Data

Oct. 27, 1995 [JP] Japan ................................. 7-280779

[51] Int. Cl.$^6$ ............................. B32B 18/00; B32B 15/04
[52] U.S. Cl. ........................ 428/469; 428/472; 428/688; 428/689; 338/22 R
[58] Field of Search .................................. 428/469, 472, 428/701, 688, 689, 446; 501/137, 138; 338/22 R, 22 SD, 224, 225, 223; 219/539, 548, 553; 361/321.2, 321.3, 321.4, 321.5

[56] References Cited

U.S. PATENT DOCUMENTS

| | | |
|---|---|---|
| 3,579,769 | 5/1971 | Matsushita . |
| 3,863,210 | 1/1975 | Roland et al. . |
| 4,081,857 | 3/1978 | Hanold, III ............................. 501/137 |
| 4,544,829 | 10/1985 | Adachi et al. . |
| 4,702,619 | 10/1987 | Camp et al. . |
| 4,801,784 | 1/1989 | Jensen et al. . |
| 4,868,711 | 9/1989 | Hirama et al. . |
| 5,117,326 | 5/1992 | Sano et al. ............................. 501/137 |
| 5,319,517 | 6/1994 | Nomura et al. ........................ 501/137 |
| 5,424,707 | 6/1995 | Ishikawa et al. . |

FOREIGN PATENT DOCUMENTS

| | | |
|---|---|---|
| 0532890 | 3/1993 | European Pat. Off. . |
| 4-280601 | 10/1992 | Japan . |
| 8-250307 | 9/1996 | Japan . |

*Primary Examiner*—Steven P. Griffin
*Attorney, Agent, or Firm*—Majestic, Parsons, Siebert & Hsue P.C.

[57] ABSTRACT

A laminated composite ceramic is formed with a positive temperature coefficient (PTC) ceramic element and either a negative temperature coefficient (NTC) ceramic element or a fixed resistance ceramic element, laminated and integrated with each other as a laminated ceramic body. An inner electrode is at least on the boundary between these ceramic elements. These elements have barium titanate as main constituents. A laminated composite ceramic element has similar ceramic elements with inner electrodes buried in parts and connected to outer electrodes formed on different side surfaces of the ceramic body. The molar % of barium and titanate Ba/Ti is preferably 0.99–1.05 for the PTC ceramic element and 0.95–1.01 for the NTC and fixed resistance ceramic elements.

37 Claims, 4 Drawing Sheets

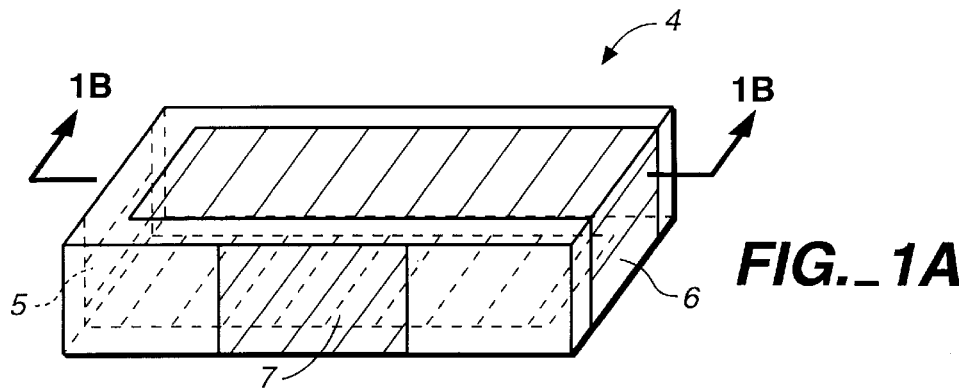
FIG._1A
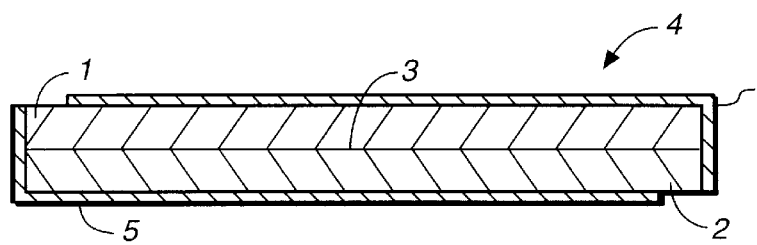
FIG._1B
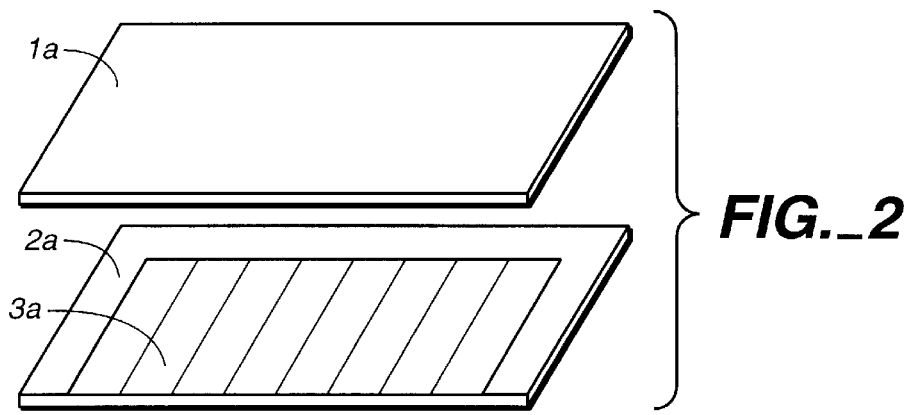
FIG._2
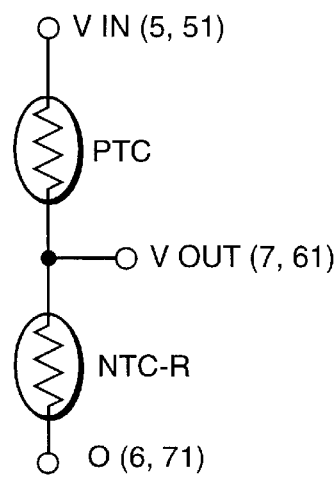
FIG._6

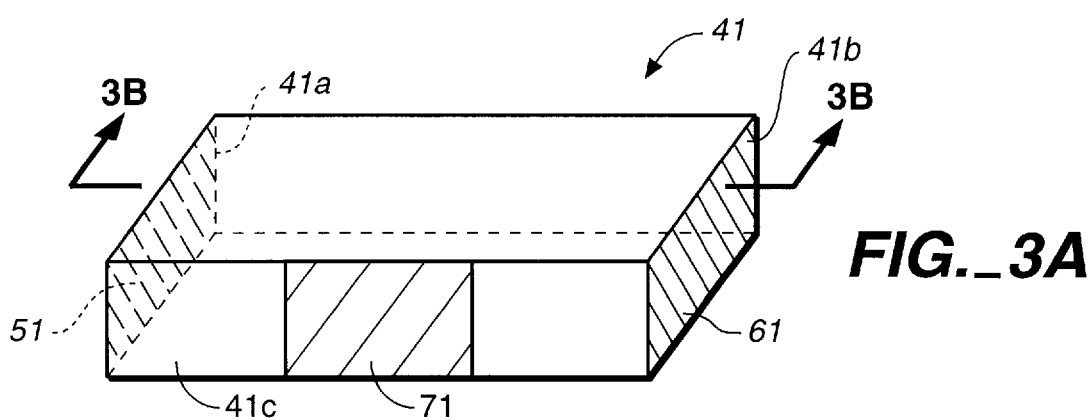
FIG._3A
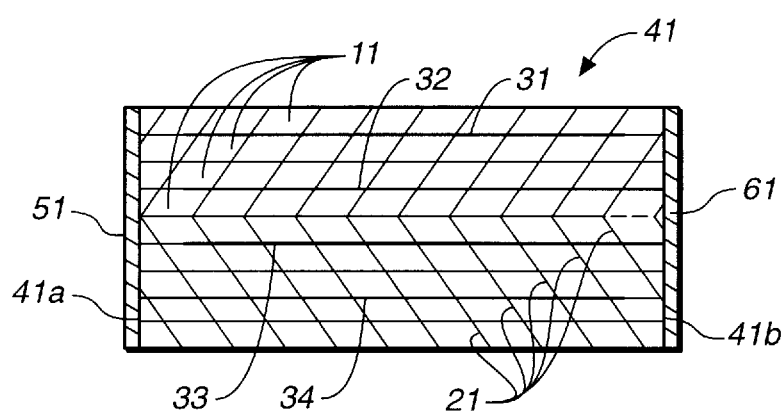
FIG._3B
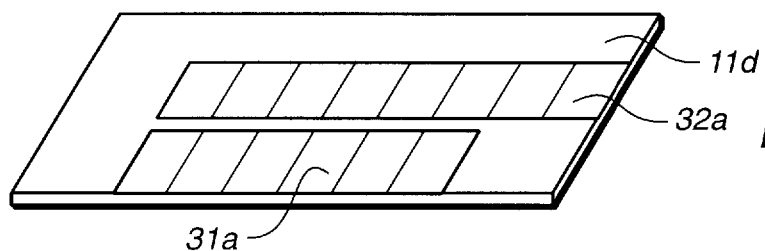
FIG._5A
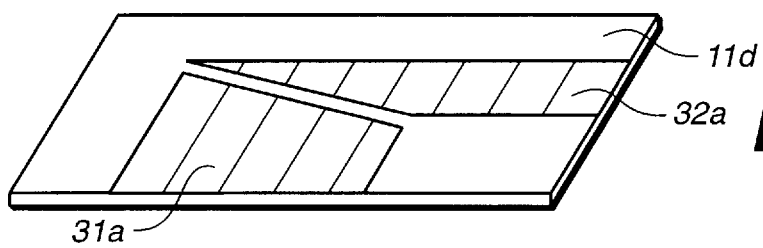
FIG._5B

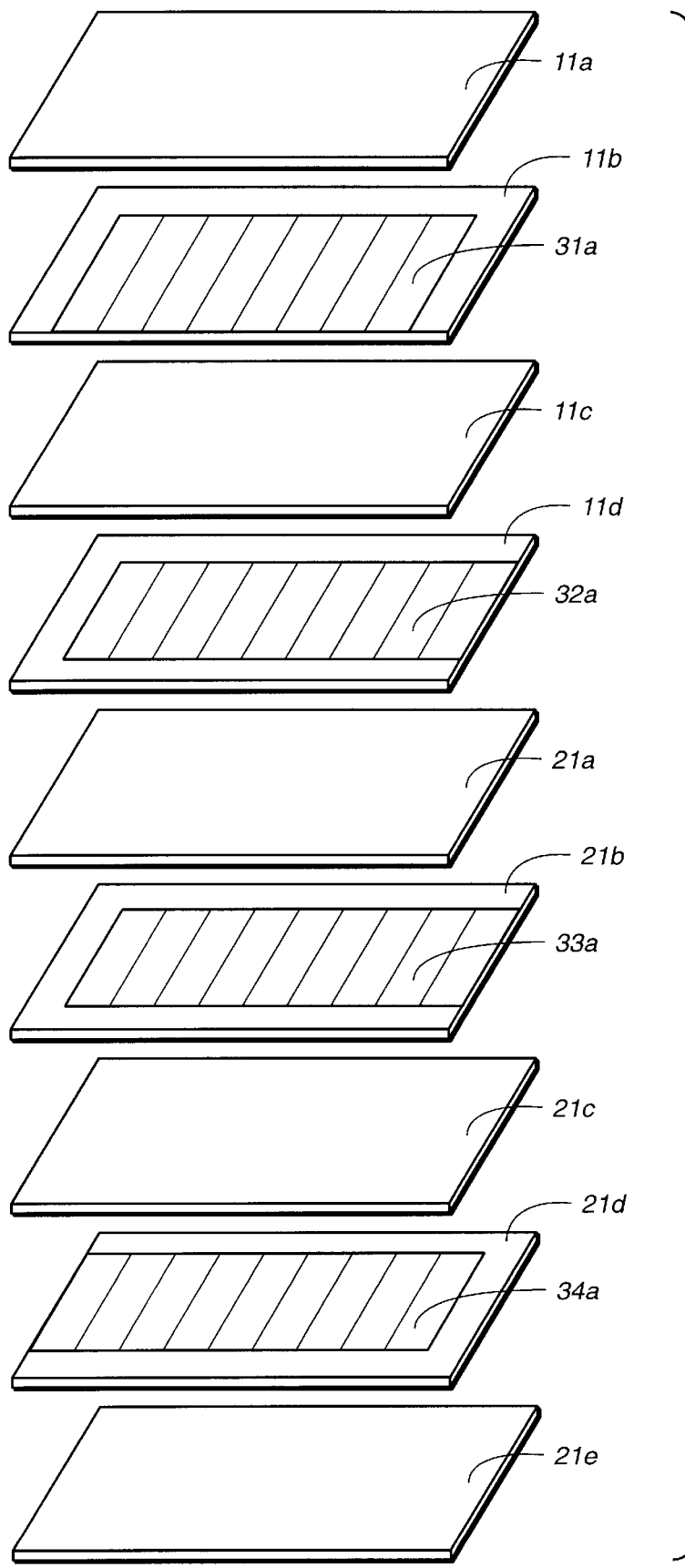
FIG._4

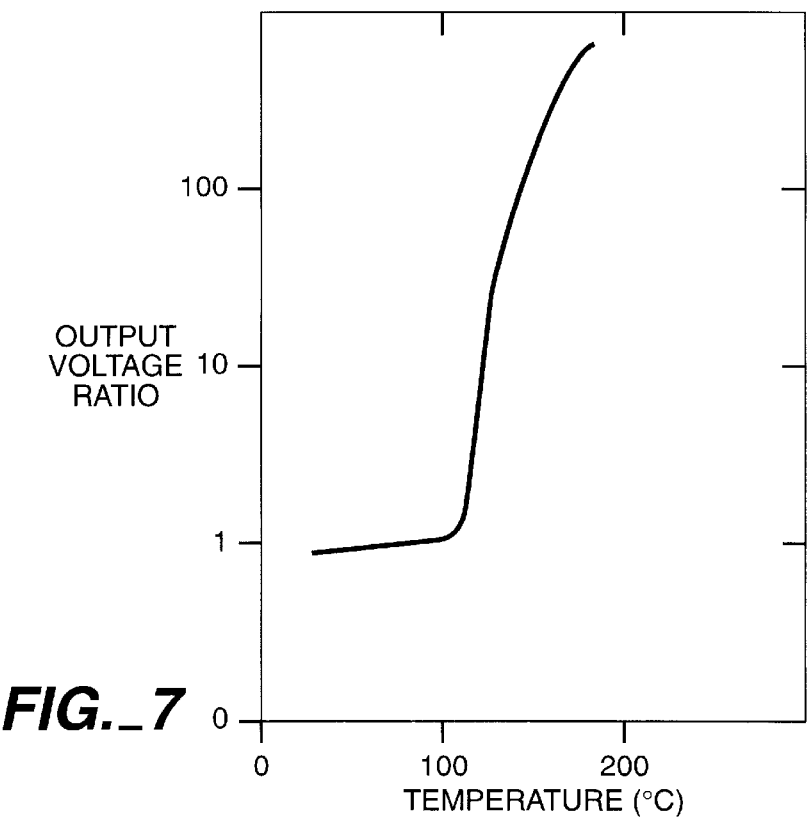
FIG._7
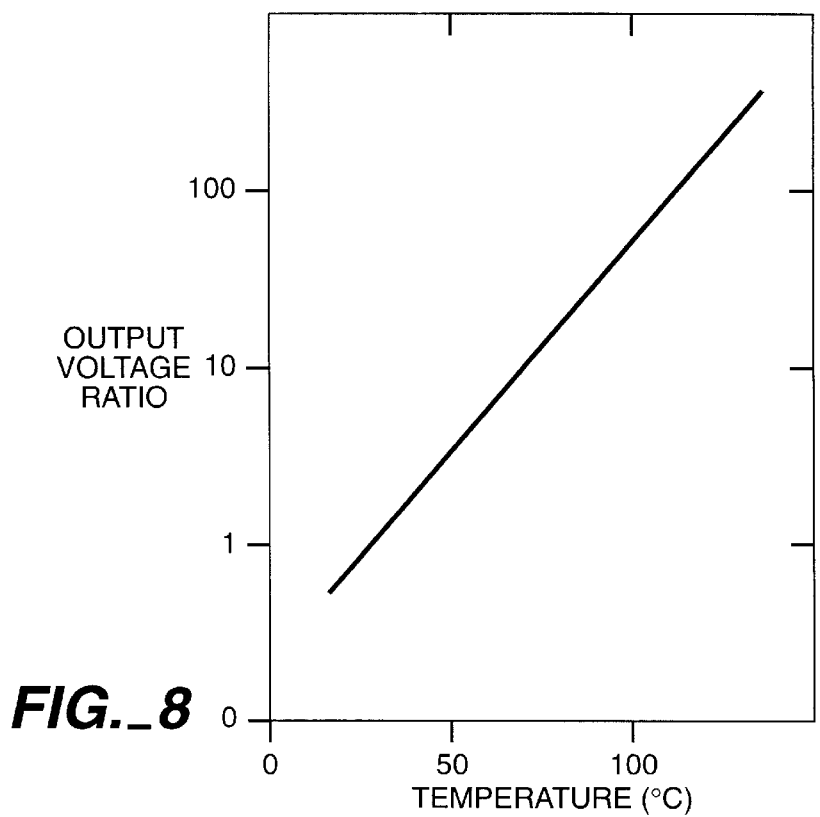
FIG._8

LAMINATED COMPOSITE CERAMICS AND ELEMENTS USING SAME

BACKGROUND OF THE INVENTION

This invention relates to laminated composite ceramics obtained by integrating a PTC (positive temperature coefficient) ceramic element and a NTC (negative temperature coefficient) ceramic element or a fixed resistance ceramic element, as well as laminated composite ceramic elements using such an integrated laminated composite ceramic.

Semiconductor ceramics having a positive resistance-temperature characteristic (hereinafter referred to as PTC ceramics) have the characteristic of suddenly increasing its resistance with temperature above the Curie point (hereinafter referred to as the PTC characteristic). On the other hand, semiconductor ceramics having a negative resistance-temperature characteristic (hereinafter referred to as NTC ceramics) have the characteristic of suddenly decreasing its resistance with increasing temperature (herein referred to as the NTC characteristic). As an example of attempts at integrating an element having the PTC characteristic (hereinafter referred to as a PTC element) and an element having the NTC characteristic (hereinafter referred to as an NTC element), Japanese Patent Publication Tokkai 4-280601 disclosed a PTC–NTC integrated element obtained by integrating a PTC element having $V_2O_3$ as its main component and an NTC element having $V_2O_3$ as its main component in a laminated, or layered, condition. One of the methods of bonding together a PTC element, an NTC element and a planar electrode made of tungsten or molybdenum is by silver-soldering.

According to another method, molded PTC and NTC ceramics with tungsten or molybdenum powder added thereto and the electrode are baked together. According to still another method, metallic powder of tungsten, molybdenum or the like is made into the form of a paste, and molded PTC and NTC ceramics and the electrode are baked together after they are covered with it.

According to the first of these methods, however, thermal bonding between the PTC and NTC elements is not good because the PTC and NTC elements and the electrode are bonded together after they are baked. Since both a burning process and a bonding process are required, furthermore, this method is not good for mass production. By the second method, the PTC and NTC characteristics are adversely affected because tungsten or molybdenum is mixed to the molded PTC or NTC ceramic. By both the second and third methods, since the electrode, the PTC ceramic and the NTC ceramic have different coefficients of thermal expansion, they are likely to peel off at the time of the burning or cracks may develop because extra force is applied on the PTC and NTC ceramics.

In addition to the above, the area of bonding is easily dislocated by prior art methods of bonding. Moreover, since metals such as vanadium oxide, tungsten and molybdenum are special metals, they are expensive materials, adversely affecting the overall production cost of the integrated elements.

SUMMARY OF THE INVENTION

It is therefore an object of this invention to provide a laminated composite ceramic with a PTC ceramic element, an NTC ceramic element or a fixed resistance ceramic element and an electrode integrated and laminated in a layered structure, obtained by using generally inexpensive materials which are easy to accommodate and still capable of eliminating the problems caused by the difference in the coefficient of thermal expansion between the ceramics and the electrode.

It is another object of this invention to provide laminated composite ceramic elements using such integrated laminated composite ceramics.

A laminated composite ceramic embodying this invention, with which the above and other objects can be accomplished, may be characterized as comprising a laminated ceramic body with a PTC ceramic element and an NTC ceramic element or a fixed resistance ceramic element laminated and integrated wherein the PTC ceramic element comprises a ceramic semiconductor having barium titanate as its main constituent and having a positive resistance-temperature characteristic, the NTC ceramic element comprises a ceramic semiconductor having barium titanate as its main constituent and having a negative resistance-temperature characteristic, the fixed resistance ceramic element comprises a ceramic resistor having barium titanate as its main constituent and there is an internal electrode. According to a preferred embodiment of the invention, the molar ratio between barium and titanium for the ceramic semiconductor of the PTC ceramic element is within the range of Ba/Ti=0.99 –1.05, and 5–25 molar % of the barium may be substituted by calcium. Similarly, the molar ratio between barium and titanium for the ceramic semiconductor of the NTC ceramic element or the ceramic resistor of the fixed resistance ceramic element according to a preferred embodiment is within the range of Ba/Ti=0.95–1.01, and the ceramic semiconductor or the ceramic resistor contains manganese oxide by 0.01–1 molar % as Mn. The ceramic semiconductor for the PTC ceramic element, the ceramic semiconductor for the NTC ceramic element or the ceramic resistor, as described above, may contain $SiO_2$ by 0.05–5 molar %.

This invention also relates to a laminated composite ceramic element having a circuit structure with a PTC ceramic element and an NTC ceramic element or a fixed resistance ceramic element connected equivalently in series, wherein the PTC ceramic element comprises a ceramic semiconductor having barium titanate as its main constituent and having a positive resistance-temperature characteristic, the NTC ceramic element comprises a ceramic semiconductor having barium titanate as its main constituent and having a negative resistance-temperature characteristic, the fixed resistance ceramic element comprises a ceramic resistor having barium titanate as its main constituent, the PTC ceramic element and the NTC or fixed resistance ceramic element are laminated and integrated to form a laminated ceramic body, and there are formed on the surface of this laminated ceramic body a first electrode for the PTC ceramic element, a second electrode for the NTC ceramic element or the fixed resistance ceramic element and a third electrode electrically connected to an inner electrode formed between the PTC ceramic element and the NTC or fixed resistance ceramic element.

This invention further relates to a laminated composite ceramic element comprising PTC ceramic elements and NTC ceramic elements or fixed resistance elements connected in series and an intermediate electrode connected to a middle connecting point between the PTC ceramic elements and the NTC or fixed resistance ceramic elements wherein the PTC ceramic elements comprise a ceramic semiconductor having barium titanate as its main constituent and having a positive resistance-temperature characteristic, the NTC ceramic elements comprise a ceramic semiconductor having barium titanate as its main constituent and having a negative resistance-temperature characteristic, the fixed resistance ceramic elements comprises a ceramic resistor having barium titanate as its main constituent, the PTC ceramic elements and the NTC or fixed resistance ceramic elements are laminated and integrated to form a laminated ceramic body having a first side surface, a second side surface and a third side surface, a first outer electrode, a second outer electrode and a third outer electrode are formed respectively on the first, second and third surfaces, a first inner electrode is formed inside the PTC ceramic elements and connected to the first outer electrode, a second inner electrode is formed inside the PTC ceramic elements and connected to the second outer electrode, a third inner electrode is formed inside the NTC ceramic elements or the fixed resistance ceramic elements and connected to the second outer electrode, and a fourth inner electrode is formed either inside the NTC or fixed resistance ceramic elements or between the PTC ceramic elements and the NTC or fixed resistance ceramic elements.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1A is a diagonal external view of a laminated composite ceramic element according to a first embodiment of this invention, and FIG. 1B is a sectional view of the ceramic element of FIG. 1A taken along line 1B—1B of FIG. 1A;

FIG. 2 is an exploded diagonal view of the laminated composite ceramic element of FIGS. 1A and 1B for showing a method of its production;

FIG. 3A is a diagonal external view of another laminated composite ceramic element according to a second embodiment of this invention, and FIG. 3B is a sectional view of the ceramic element of FIG. 3A taken along line 3B—3B of FIG. 3A;

FIG. 4 is an exploded view of the laminated composite ceramic element of FIGS. 3A and 3B for showing a method of its production;

FIGS. 5A and 5B are diagonal views of ceramic sheets with mutually bucking inner electrodes;

FIG. 6 is a circuit diagram used in tests on embodiments of this invention; and

FIGS. 7 and 8 are graphs showing the output voltage ratio-temperature characteristics of laminated composite ceramic elements according to this invention.

DETAILED DESCRIPTION OF THE INVENTION

In what follows, structures of laminated composite ceramic elements using laminated composite ceramics according to this invention will be explained. FIGS. 1A and 1B show a laminated composite ceramic element 4 according to a first embodiment of this invention, comprising a ceramic element (hereinafter referred to as the NTC-R ceramic element) 1 which may be either a semiconductor ceramic element having a negative resistance-temperature coefficient or a fixed resistance ceramic element, another semiconductor ceramic element 2 having a positive resistance-temperature characteristic (hereinafter referred to as the PTC ceramic element), an inner electrode 3, a first outer electrode 5 for the PTC ceramic element, a second outer electrode 6 for the NTC-R ceramic terminal and a third outer electrode 7 electrically connected to the inner electrode 3. Throughout herein, expression "fixed resistance" is used wherein the change in resistance is by less than 1.5 times within the range between room temperature and 200° C. Only if the change within this temperature range is greater than 1.5 times, expressions "NTC characteristics" and "PTC characteristic" will be used, depending on whether the resistance-temperature characteristic is negative or positive, respectively.

The inner electrode 3 has one of its ends extended forward to the front surface (with reference to FIG. 1A) so as to be in an electrically contacting relationship with the third outer electrode 7. The other end of the inner electrode 3 is buried inside the body of the laminated composite ceramic element 4. The first outer electrode 5 is formed on two of the surfaces adjacent to the one on which the third outer electrode is formed, being connected to the PTC ceramic element 2. The second outer electrode 6 is formed on the two surfaces which are opposite to the first outer electrode 5 and is connected to the NTC-R ceramic element 1.

The NTC-R ceramic element 1 and the PTC ceramic element 2 comprise a ceramic material of which the main constituent is barium titanate. The main constituent of the inner electrode 3 is nickel. The first outer electrode 5, the second outer electrode 6 and the third outer electrode 7 have silver as their main constituent. Throughout herein, "the main constituent" will mean any constituent which is contained by 50% or more.

This embodiment of the invention will be further explained for a situation where a ceramic green sheet, which is an unburnt ceramic, is used. First, barium carbonate, calcium carbonate, titanium oxide, lanthanum oxide, manganese oxide and silicon oxide are provided and

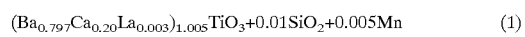

$$(Ba_{0.797}Ca_{0.20}La_{0.003})_{1.005}TiO_3+0.01SiO_2+0.005Mn \qquad (1)$$

and

$$(Ba_{0.997}La_{0.003})_{0.995}TiO_3+0.01SiO_2 \qquad (2)$$

were prepared. Materials thus prepared were placed inside a polyethylene pot together with pure water and zirconia balls and subjected for five hours to wet blending and crushing, and after they were dried, there were provisionally burnt in air for 2 hours at 1100° C. Water, a binder and a dispersing agent were added to this provisionally burnt powder and subjected together with the zirconia balls to a wet blending and crushing process for 12 hours to produce a ceramic slurry. Ceramic green sheets were obtained from this ceramic slurry by a doctor blade method. The PTC ceramic element 2 is obtained by using (1), and the NTC-R ceramic element 1 is obtained by using (2).

As shown in FIG. 2, the laminated composite ceramic element 4 was produced by first preparing a ceramic green sheet 1a (hereinafter referred to as the NTC-R sheet), which is to become the NTC-R ceramic element 1 and was obtained as described above, and another ceramic green sheet 2a (hereinafter referred to as the PTC sheet), which is to become the PTC ceramic element 2 and was obtained also as described above. Next, a conductor pattern 3a, which is to become the inner electrode 3, was formed on one of the main surfaces of the PTC sheet 2a by a screen printing method by using a conductive paste made of a mixture of nickel powder and a varnish. The NTC-R sheet 1a was placed over the surface of the PTC sheet 2a with the conductor pattern 3a, and they were pressed together to obtain a laminated body.

After the binder was burnt in air, the laminated body was burnt for 2 hours at 1350° C. in an atmosphere of $H_2/N_2$ to obtain a laminated composite ceramic. The outer electrodes 5, 6 and 7 were formed by applying a silver paste on the surfaces of the laminated composite ceramic thus obtained and subjecting it to a heat treatment for one hour at 800° C. in air. The bonding process with the silver paste serves also as a re-oxidation process of the laminated composite ceramic. Although FIGS. 1A and 1B show an embodiment with two layers (that is, the PTC ceramic element 2 and the NTC-R ceramic element 1) and FIG. 2 shows a method with only two sheets (that is, the PTC sheet 2a and the NTC-R sheet 1a), any larger number of layers may be formed, depending on the characteristics to be obtained.

FIGS. 3A and 3B show another laminated composite ceramic element 41 according to a second embodiment of this invention, comprising laminated ceramic body with NTC-R ceramic elements 11 and PTC ceramic elements 21 laminated and integrated and having inner electrodes 31 and 32 formed inside the region of the NTC-R ceramic elements 11 and inner electrodes 33 and 34 formed inside the region of the PTC ceramic elements 21. Inner electrode 31 has one of its ends extended forward to the front surface (with reference to FIG. 3A, and referred to as the third side surface 41c) so as to be in an electrically contacting relationship with an outer electrode 71 formed thereon. The other end of this inner electrode 31 is buried inside region of the NTC-R ceramic elements 11. Inner electrode 32 is also formed inside the region of the NTC-R ceramic elements 11, and one of its ends is extended to the right-hand side surface (with reference to FIGS. 3A and 3B, and referred to as the second side surface 41b adjacent to the aforementioned third side surface 41c) so as to be in an electrically connected relationship with another outer electrode 61 formed thereon. The other end of this inner electrode 32 is buried inside the region of the NTC-R ceramic elements 11.

Inner electrodes 33 and 34 are formed inside the region of the PTC ceramic elements 21. Inner electrode 33 has one of its ends extended to the aforementioned second side surface 41b so as to be also in an electrically connected relationship with the outer electrode 61 formed thereon. The other end of inner electrode 33 is buried inside the region of the PTC ceramic elements 21. Inner electrode 34 has one of its ends extended to the side surface of the laminated composite ceramic element 41 opposite the second side surface 41b (referred to as the first side surface 41a) so as to be in an electrically connected relationship with another outer electrode 51 formed thereon. The other end of inner electrode 34 is also buried inside the region of the PTC ceramic elements 21. Thus, inner electrode 32 in the NTC-R ceramic elements 11 and inner electrode 33 in the PTC ceramic elements 21 are electrically connected to each other through the outer electrode 61.

As a variation of the above, inner electrode 31 may be formed between the NTC-R ceramic elements 11 and the PTC ceramic elements 21, instead of inside the region of the NTC-R ceramic elements 11.

In the above, the NTC-R ceramic elements 11 and the PTC ceramic elements 21 are made of a ceramic with barium titanate as its main constituent. The main constituent of the inner electrodes 31–34 is nickel. The outer electrodes 51, 61 and 71 formed respectively on the first, second and third side surfaces 41a, 41b and 41c of the laminated composite ceramic element 41 have silver as their main constituent.

A method of producing the laminated composite ceramic element 41 described above will be explained next with reference to FIG. 4. First, NTC-R sheets 11a–11d and PTC sheets 21a–21e, obtained from the same materials and by the same method as explained above with reference to FIG. 2, are provided. Next, a conductor pattern 31a for forming the first inner conductor 31, another conductor pattern 32a for forming the second inner conductor 32, and still other conductor patterns 33a and 34a for forming the third and fourth inner electrodes 33 and 34 are formed on a main surface respectively of the NTC-R sheets 11b and 11d and the PTC sheets 21b and 21d by a screen printing method by using a conductive paste obtained by mixing nickel powder with a varnish. These NTC-R and PTC sheets 11b, 11d, 21b and 21d with the conductor patterns 31a, 32a, 33a and 34a respectively formed thereon and NTC-R sheets 11a and 11c and PTC sheets 21a, 21c and 2e with no conductor patterns formed thereon are stacked sequentially one on top of another as shown in FIG. 4 and compressed together to obtain a laminated body.

After the binder was burnt in air, the laminated body was burnt for 2 hours at 1350° C. in an atmosphere of $H_2/N_2$ to obtain a laminated composite ceramic. Outer electrodes 51, 61 and 71 were formed by applying a silver paste on the surfaces of the laminated composite ceramic thus obtained and subjecting it to a heat treatment for one hour at 800° C. in air. The bonding process with the silver paste serves also as a re-oxidation process of the laminated composite ceramic.

The stacking sequence need not be as shown in FIG. 4. The layers may be so arranged, for example, that the PTC sheet 21e is at the top and the NTC-R sheet 11a is at the bottom. Although FIGS. 3A and 3B showed an arrangement with nine layers with five layers of PTC ceramic elements 21 and four layers of NTC-R ceramic elements 11 and FIG. 4 showed another arrangement with five PTC sheets 21a–21e and four NTC-R sheets 11a–11d, the number of layers may be selectively determined according to the characteristics which are desired. The number of inner electrodes 33 and 34 to be formed inside the region of PTC ceramic elements 21 may be selected at will. Although the two inner electrodes 31 and 32 formed inside the region of NTC-R ceramic elements 11 are each on respective one of the two sheets 11b and 11d, they may be formed on either one of these two NTC-R ceramic sheets 11b and 11d in a mutually bucking relationship.

FIGS. 5A and 5B show examples wherein two conductor patterns 31a and 32a are formed on one of the main surfaces of the same NTC-R ceramic sheet 11d for providing two mutually bucking inner electrodes 31 and 32 (say, as shown in FIG. 3B) such that inner electrode 31 has one edge thereof in an electrically connected relationship with the outer electrode 71 formed on the third side surface 41c of the laminated composite ceramic element 41 and the other edge thereof buried inside the main body of the element 41. Inner electrode 32 has one edge thereof extending to the second side surface 41b and electrically connected to the outer electrode 61 formed thereon and the other edge thereof buried also inside the main body of the element 41. The edges of the two inner electrodes 31 and 32 buried inside the element 41 are arranged so as not to contact or cross each other. The manner in which two inner electrodes are in mutually bucking relationship need not be as shown in FIG. 5A or 5B. Many modifications and variations are possible as long as the conditions given above are satisfied.

Alternatively, conductor patterns may form equivalents of inner electrodes 31 and 32 within the region of the PTC ceramic elements 21 and equivalents of inner electrodes 33 and 34 inside the region of the NTC-R ceramic elements 11. In this case, the first, second and third side surfaces will be respectively indicated by 41c, 41b and 41a, electrodes 71, 61 and 51 being formed thereon, respectively.

The laminated composite ceramic element 41 of FIGS. 3A and 3B was used as a voltage divider between the PTC ceramic elements 21 and the NTC-R ceramic elements 11, as shown in FIG. 6, to output an output voltage $V_{out}$. FIG. 7 shows the relationship between the output voltage ratio and temperature for this voltage divider. In FIG. 7, the vertical axis indicates the output voltage ratio, defined as the ratio between the output voltage ($V_{out}$) at a given temperature and the output voltage at 25° C. ($V_{out-25}$), and the horizontal axis indicates the temperature. FIG. 7 shows that the output voltage ratio increases rapidly at a certain temperature and that the laminated composite ceramic element 41 embodying this invention can detect an overheated condition of a transistor.

Next, examples with PTC and NTC-R ceramic elements with compositions slightly different from those of the laminated composite ceramic elements 4 and 41, described above, will be described.

TEST 1

Laminated composite ceramic elements were obtained by varying the molar ratio of barium to titanium in the PTC ceramic element of Formula (1) as shown in Table 1 and using the same method as used in the second embodiment of the invention described above. Circuits as shown in FIG. 6 were made by using these laminated composite ceramic elements, and the resistance of the PTC ceramic elements, their characteristics and the output voltage ratios were measured. The results of these measurements are also shown in Table 1. The output voltage ratio is herein defined as the ratio of output voltage at 150° C. ($V_{out-150}$) to that at 100° C. ($V_{out-100}$). Table 1 shows that sufficient output control is possible if the molar ratio Ba/Ti is within the range of 0.99–1.05. If the molar ratio Ba/Ti is less than 0.99, the PTC ceramic element exhibits the NTC characteristic. If the molar ratio Ba/Ti is greater than 1.05, the resistance at room temperature becomes too high for adequate output control.

TABLE 1

| | PTC Ceramic Element | | |
| Molar Ratio Ba/Ti | Resistance at Room Temperature (Ω) | Characteristic | Output Voltage Ratio |
| --- | --- | --- | --- |
| 0.97 | 250 | NTC | 1.5 |
| 0.99 | 320 | PTC | 12 |
| 1.00 | 380 | PTC | 150 |
| 1.01 | 520 | PTC | 80 |
| 1.03 | 720 | PTC | 63 |
| 1.05 | 950 | PTC | 15 |
| 1.07 | 15000 | PTC | 1.2 |

TEST 2

Laminated composite ceramic elements were obtained by varying the molar ratio of barium to calcium in the PTC ceramic element of Formula (1) as shown in Table 2 and using the same method as used in the second embodiment of the invention described above. Circuits as shown in FIG. 6 were made by using these laminated composite ceramic elements, and the resistance of the PTC ceramic elements, their characteristics and the output voltage ratios were measured. The results of these measurements are also shown in Table 2. The output voltage ratio is as defined above in Test 1. Table 2 shows that sufficient output control is possible if the amount of substituted calcium is within the range of 5–25 molar %. The PTC characteristic is not shown if it is less than 5 molar %. If it is over 25 molar %, the resistance becomes too high for adequate output control.

TABLE 2

| | PTC Ceramic Element | | |
| Ca Content (Molar %) | Resistance at Room Temperature (Ω) | Characteristic | Output Voltage Ratio |
| --- | --- | --- | --- |
| 0 | 50 | NTC | 1.2 |
| 3 | 150 | PTC | 2.8 |
| 5 | 250 | PTC | 25 |
| 10 | 350 | PTC | 35 |
| 20 | 380 | PTC | 160 |
| 25 | 580 | PTC | 35 |
| 30 | 13000 | PTC | 1.8 |

TEST 3

Laminated composite ceramic elements were obtained by varying the molar ratio of barium to titanium in the NTC-R ceramic element of Formula (2) as shown in Table 3 and using the same method as used in the second embodiment of the invention described above. Circuits as shown in FIG. 6 were made by using these laminated composite ceramic elements, and the resistance of the NTC-R ceramic elements, their characteristics and the output voltage ratios were measured. The results of these measurements are also shown in Table 3. The output voltage ratio is as defined above in Test 1. Table 3 shows that sufficient output control is possible if the molar ratio Ba/Ti is within the range of 0.95–1.01. If the molar ratio Ba/Ti is less than 0.95, the resistance is too high. If it is greater than 1.03, the output control becomes difficult because a PTC characteristic appears.

TABLE 3

| | NTC-R Ceramic Element | | |
| Molar Ratio Ba/Ti | Resistance at Room Temperature (Ω) | Characteristic | Output Voltage Ratio |
| --- | --- | --- | --- |
| 0.93 | 1500 | NTC | 1.2 |
| 0.95 | 850 | NTC | 12 |
| 0.97 | 380 | NTC | 25 |
| 0.99 | 250 | NTC | 160 |
| 1.01 | 450 | - (*1) | 85 |
| 1.03 | 15000 | NTC | 5.5 |

(*1): NTC characteristic was not shown.

TEST 4

Laminated composite ceramic elements were obtained by causing the PTC ceramic element of Formula (1) to contain manganese oxide at the rates shown in Table 4 (as converted to Mn) and using the same method as used in the second embodiment of the invention described above. Circuits as shown in FIG. 6 were made by using these laminated composite ceramic elements, and the resistance of the PTC ceramic elements, their characteristics and the output voltage ratios were measured. The results of these measurements are also shown in Table 4. The output voltage ratio is as defined above in Test 1. Table 4 shows that sufficient output control is possible if the content of Mn is within the range of 0.01–1 molar %. The PTC characteristic becomes too small if the content of Mn is less than 0.01 molar % and there is no significant effect. If the content of Mn exceeds 1 molar %, the resistance becomes too high.

TABLE 4

PTC Ceramic Element

| Mn Content (Molar %) | Resistance at Room Temperature (Ω) | Characteristic | Output Voltage Ratio |
|---|---|---|---|
| 0 | 50 | PTC | 3.5 |
| 0.005 | 150 | PTC | 8.2 |
| 0.01 | 250 | PTC | 19 |
| 0.05 | 380 | PTC | 180 |
| 0.1 | 400 | PTC | 230 |
| 0.5 | 580 | PTC | 110 |
| 1 | 890 | PTC | 35 |
| 2 | 250000 | PTC | 1.2 |

TEST 5

Laminated composite ceramic elements were obtained by causing the PTC ceramic element of Formula (1) and the NTC-R ceramic element of Formula (2) to contain $SiO_2$ at the rates shown in Table 5 and using the same method as used in the second embodiment of the invention described above. Circuits as shown in FIG. 6 were made by using these laminated composite ceramic elements, and the resistance of the PTC ceramic elements, that of the NTC-R ceramic elements and the output voltage ratios were measured. The results of these measurements are also shown in Table 5. The output voltage ratio is as defined above in Test 1. Table 5 shows that sufficient output control is possible if the content of $SiO_2$ is within the range of 0.05–5 molar %. The PTC characteristic becomes too small if the content of $SiO_2$ is less than 0.05 molar % and there is no significant effect. If the content of $SiO_2$ exceeds 5 molar %, the resistance becomes too high. If the content is less than 0.05 molar %, the mechanical strength becomes small and defects such as peeling occur in many situation.

TABLE 5

| | PTC Ceramic Element | NTC-R Ceramic Element | Output |
|---|---|---|---|
| $SiO_2$ Content (molar %) | Resistance at Room Temperature (Ω) | | Voltage Ratio |
| 0 | 890 | 600 | 2.1 |
| 0.01 | 780 | 580 | 3.5 |
| 0.05 | 450 | 450 | 12 |
| 0.1 | 400 | 320 | 58 |
| 0.5 | 350 | 280 | 120 |
| 1 | 280 | 300 | 150 |
| 5 | 520 | 460 | 130 |
| 10 | 15000 | 2300 | 8.2 |

TEST 6

Examples of temperature detection have been mainly described above. Laminated composite ceramic elements were obtained in Test 6 by replacing 20% of barium in PTC ceramic element by strontium to prepare:

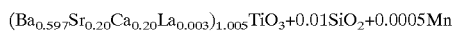

$(Ba_{0.597}Sr_{0.20}Ca_{0.20}La_{0.003})_{1.005}TiO_3+0.01SiO_2+0.0005Mn$ by the same method as used in the second embodiment of the invention described above. A circuit as shown in FIG. 6 was made by using these laminated composite ceramic elements, and a straight line as shown in FIG. 8 was obtained as its output voltage ratio-temperature characteristic. The output voltage ratio is as defined above with reference to the second embodiment of this invention. FIG. 8 shows that the output changes gradually from the room temperature and hence this can be used for temperature compensation.

EFFECTS OF THE INVENTION

Laminated composite ceramics according to this invention are characterized as having a ceramic semiconductor having a positive resistance-temperature characteristic, a ceramic semiconductor having a negative resistance-temperature characteristic or a ceramic resistor and inner electrodes integrated by burning such that an integrated body can be formed without dislocations between the individual ceramics and the inner electrodes, and the integrated body can be made compact. Moreover, they can be produced at a lower cost because many of production steps in prior art methods of production can be omitted.

Since the ceramic semiconductors and the ceramic resistors according to this invention have barium titanate as their main constituents and the inner electrodes are mainly of nickel, laminated composite ceramics embodying this invention can be produced with inexpensive easy-to-obtain materials and hence can be produced at lower costs by mass production.

Another merit of this invention is that the ceramic semiconductors and the ceramic resistors in laminated composite ceramics according to this invention can significantly exhibit their individual characteristics.

What is claimed is:

1. A laminated composite ceramic comprising:
   a first ceramic element which is a positive temperature coefficient (PTC) ceramic element;
   a second ceramic element which is selectable either a negative temperature coefficient (NTC) ceramic element or a fixed resistance ceramic element, there being a boundary surface between said first ceramic element and said second ceramic element; and
   an inner electrode formed at least at a specified position selected from the group consisting of a first position which is on said boundary surface and a second position which is inside said NTC ceramic element;
   said first ceramic element and said second ceramic element being laminated, integrated and then burnt with each other as a laminated ceramic body;
   said PTC ceramic element consisting of a first ceramic semiconductor having barium titanate as main constituent thereof and having a positive resistance-temperature characteristic, the molar % of barium and titanium in said first ceramic semiconductor being Ba/Ti=0.99–1.05;
   said NTC ceramic element consisting of a second ceramic semiconductor having barium titanate as main constituent thereof and having a negative resistance-temperature characteristic; and
   said fixed resistance ceramic element consisting of a ceramic resistor having barium titanate as main constituent thereof.

2. The laminated composite ceramic of claim 1 wherein 5–25 molar % of the barium in said first ceramic semiconductor is substituted by calcium.

3. The laminated composite ceramic of claim 2 wherein at least one selected from said first ceramic semiconductor, said second ceramic semiconductor and said ceramic resistor contains $SiO_2$ by 0.05–5 molar %.

4. The laminated composite ceramic of claim 1 wherein at least one selected from said first ceramic semiconductor, said second ceramic semiconductor and said ceramic resistor contains $SiO_2$ by 0.05–5 molar %.

5. A laminated composite ceramic comprising:

a first ceramic element which is a positive temperature coefficient (PTC) ceramic element;

a second ceramic element which is selectably either a negative temperature coefficient (NTC) ceramic element or a fixed resistance ceramic element, there being a boundary surface between said first ceramic element and said second ceramic element; and an inner electrode formed at least at a specified position selected from the group consisting of a first position which is on said boundary surface and a second position which is inside said NTC ceramic element;

said first ceramic element and said second ceramic element being laminated, integrated and then burnt with each other as a laminated ceramic body;

said PTC ceramic element consisting of a first ceramic semiconductor having barium titanate as main constituent thereof and having a positive resistance-temperature characteristic, 5–25 molar % of the barium in said first ceramic semiconductor being substituted by calcium;

said NTC ceramic element consisting of a second ceramic semiconductor having barium titanate as main constituent thereof and having a negative resistance-temperature characteristic; and said fixed resistance ceramic element consisting of a ceramic resistor having barium titanate as main constituent thereof.

6. The laminated composite ceramic of claim 5 wherein at least one selected from said first ceramic semiconductor, said second ceramic semiconductor and said ceramic resistor contains $SiO_2$ by 0.05–5 molar %.

7. A laminated composite ceramic comprising:

a first ceramic element which is a positive temperature coefficient (PTC) ceramic element;

a second ceramic element which is selectable either a negative temperature coefficient (NTC) ceramic element or a fixed resistance ceramic element, there being a boundary surface between said first ceramic element and said second ceramic element; and an inner electrode formed at least at a specified position selected from the group consisting of a first position which is on said boundary surface and a second position which is inside said NTC ceramic element;

said first ceramic element and said second ceramic element being laminated, integrated and then burnt with each other as a laminated ceramic body;

said PTC ceramic element consisting of a first ceramic semiconductor having barium titanate as main constituent thereof and having a positive resistance-temperature characteristic;

said NTC ceramic element consisting of a second ceramic semiconductor having barium titanate as main constituent thereof and having a negative resistance-temperature characteristic; and said fixed resistance ceramic element consisting of a ceramic resistor having barium titanate as main constituent thereof, said second ceramic semiconductor and said ceramic resistor containing manganese oxide by 0.01–1 molar % as Mn.

8. The laminated composite ceramic of claim 7 wherein at least one selected from said first ceramic semiconductor, said second ceramic semiconductor and said ceramic resistor contains $SiO_2$ by 0.05–5 molar %.

9. The laminated composite ceramic comprising:

a first ceramic element which is a positive temperature coefficient (PTC) ceramic element;

a second ceramic element which is selectable either a negative temperature coefficient (NTC) ceramic element or a fixed resistance ceramic element, there being a boundary surface between said first ceramic element and said second ceramic element; and an inner electrode formed at least at a specified position selected from the group consisting of a first position which is on said boundary surface and a second position which is inside said NTC ceramic element;

said first ceramic element and said second ceramic element being laminated, integrated and then burnt with each other as a laminated ceramic body;

said PTC ceramic element consisting of a first ceramic semiconductor having barium titanate as main constituent thereof and having a positive resistance-temperature characteristic;

said NTC ceramic element consisting of a second ceramic semiconductor having barium titanate as main constituent thereof and having a negative resistance-temperature characteristic; and said fixed resistance ceramic element consisting of a ceramic resistor having barium titanate as main constituent thereof, at least one selected from said first ceramic semiconductor and said ceramic resistor containing $SiO_2$ by 0.05–5 molar %.

10. A laminated composite ceramic element comprising:

a first ceramic element which is a positive temperature coefficient (PTC) ceramic element, said PTC ceramic element consisting of a first ceramic semiconductor having barium titanate as main constituent thereof and having a positive resistance-temperature characteristic;

a second ceramic element which is selectably either a negative temperature coefficient (NTC) ceramic element or a fixed resistance ceramic element, said NTC ceramic element consisting of a second ceramic semiconductor having barium titanate as main constituent thereof and having a negative resistance-temperature characteristic, said fixed resistance ceramic element consisting of a ceramic resistor having barium titanate as main constituent thereof, said first ceramic element and said second ceramic element being laminated and integrated with each other as a laminated ceramic body, said laminated ceramic body having side surfaces;

an inner electrode between said first ceramic element and said second ceramic element;

a first electrode for said first ceramic element;

a second electrode for said second ceramic element; and a third electrode electrically connected to said inner electrode;

said first electrode, said second electrode and said third electrode being on said side surfaces of said laminated ceramic body.

11. The laminated composite ceramic element of claim 10 wherein the molar % of barium and titanium in said first ceramic semiconductor is Ba/Ti=0.99–1.05.

12. The laminated composite ceramic element of claim 11 wherein 5–25 molar % of the barium in said first ceramic semiconductor is substituted by calcium.

13. The laminated composite ceramic element of claim 12 wherein at least one selected from said first ceramic semiconductor, said second ceramic semiconductor and said ceramic resistor contains $SiO_2$ by 0.05–5 molar %.

14. The laminated composite ceramic element of claim 11 wherein at least one selected from said first ceramic semiconductor, said second ceramic semiconductor and said ceramic resistor contains $SiO_2$ by 0.05–5 molar %.

15. The laminated composite ceramic element of claim 10 wherein 5–25 molar % of the barium in said first ceramic semiconductor is substituted by calcium.

16. The laminated composite ceramic element of claim 15 wherein at least one selected from said first ceramic semiconductor, said second ceramic semiconductor and said ceramic resistor contains $SiO_2$ by 0.05–5 molar %.

17. The laminated composite ceramic element of claim 10 wherein the molar % of barium and titanium in said second ceramic semiconductor and said ceramic resistor is Ba/Ti= 0.95–1.01.

18. The laminated composite ceramic element of claim 17 wherein said second ceramic semiconductor and said ceramic resistor contain manganese oxide by 0.01–1 molar % as Mn.

19. The laminated composite ceramic element of claim 18 wherein at least one selected from said first ceramic semiconductor, said second ceramic semiconductor and said ceramic resistor contains $SiO_2$ by 0.05–5 molar %.

20. The laminated composite ceramic element of claim 17 wherein at least one selected from said first ceramic semiconductor, said second ceramic semiconductor and said ceramic resistor contains $SiO_2$ by 0.05–5 molar %.

21. The laminated composite ceramic element of claim 10 wherein said second ceramic semiconductor and said ceramic resistor contain manganese oxide by 0.01–1 molar % as Mn.

22. The laminated composite ceramic element of claim 21 wherein at least one selected from said first ceramic semiconductor, said second ceramic semiconductor and said ceramic resistor contains $SiO_2$ by 0.05–5 molar %.

23. The laminated composite ceramic element of claim 10 wherein at least one selected from said first ceramic semiconductor, said second ceramic semiconductor and said ceramic resistor contains $SiO_2$ by 0.05–5 molar %.

24. A laminated composite ceramic element comprising:
a first ceramic element which consists of positive temperature coefficient (PTC) ceramic elements, said PTC ceramic elements consisting of a first ceramic semiconductor having barium titanate as main constituent thereof and having a positive resistance-temperature characteristic;
a second ceramic element which consists selectably either of negative temperature coefficient (NTC) ceramic elements or fixed resistance ceramic elements, said NTC ceramic elements consisting of a second ceramic semiconductor having barium titanate as main constituent thereof and having a negative resistance-temperature characteristic, said fixed resistance ceramic elements consisting of a ceramic resistor having barium titanate as main constituent thereof, said first ceramic element and said second ceramic element being laminated and integrated with each other as a laminated ceramic body, said laminated ceramic body having a first side surface, a second side surface and a third side surface;
a first outer electrode on said first side surface;
a second outer electrode on said second side surface;
a third outer electrode on said third side surface;
a first inner electrode formed inside said first ceramic element and connected to said first outer electrode;
a second inner electrode formed inside said first ceramic element and connected to said second outer electrode;
a third inner electrode formed inside said second ceramic element and connected to said second outer electrode; and
a fourth inner electrode formed either inside said second ceramic element or between said first ceramic element and said second ceramic element;
wherein said first ceramic element and said second ceramic element are connected in series having an intermediate electrode connected to a mid-point therebetween, said second outer electrode serving as said intermediate electrode.

25. The laminated composite ceramic element of claim 24 wherein the molar % of barium and titanium in said first ceramic semiconductor is Ba/Ti=0.99–1.05.

26. The laminated composite ceramic element of claim 25 wherein 5–25 molar % of the barium in said first ceramic semiconductor is substituted by calcium.

27. The laminated composite ceramic element of claim 26 wherein at least one selected from said first ceramic semiconductor, said second ceramic semiconductor and said ceramic resistor contains $SiO_2$ by 0.05–5 molar %.

28. The laminated composite ceramic element of claim 25 wherein at least one selected from said first ceramic semiconductor, said second ceramic semiconductor and said ceramic resistor contains $SiO_2$ by 0.05–5 molar %.

29. The laminated composite ceramic element of claim 24 wherein 5–25 molar % of the barium in said first ceramic semiconductor is substituted by calcium.

30. The laminated composite ceramic element of claim 29 wherein at least one selected from said first ceramic semiconductor, said second ceramic semiconductor and said ceramic resistor contains $SiO_2$ by 0.05–5 molar %.

31. The laminated composite ceramic element of claim 24 wherein the molar % of barium and titanium in said second ceramic semiconductor and said ceramic resistor is Ba/Ti= 0.95–1.01.

32. The laminated composite ceramic element of claim 31 wherein said second ceramic semiconductor and said ceramic resistor contain manganese oxide by 0.01–1 molar % as Mn.

33. The laminated composite ceramic element of claim 32 wherein at least one selected from said first ceramic semiconductor, said second ceramic semiconductor and said ceramic resistor contains $SiO_2$ by 0.05–5 molar %.

34. The laminated composite ceramic element of claim 31 wherein at least one selected from said first ceramic semiconductor, said second ceramic semiconductor and said ceramic resistor contains $SiO_2$ by 0.05–5 molar %.

35. The laminated composite ceramic element of claim 24 wherein said second ceramic semiconductor and said ceramic resistor contain manganese oxide by 0.01–1 molar % as Mn.

36. The laminated composite ceramic element of claim 35 wherein at least one selected from said first ceramic semiconductor, said second ceramic semiconductor and said ceramic resistor contains $SiO_2$ by 0.05–5 molar %.

37. The laminated composite ceramic element of claim 24 wherein at least one selected from said first ceramic semiconductor, said second ceramic semiconductor and said ceramic resistor contains $SiO_2$ by 0.05–5 molar %.

* * * * *